A. HUHN.
APPARATUS FOR DRYING AND STERILIZING CEREALS.
APPLICATION FILED AUG. 13, 1917. RENEWED JAN. 14, 1922.
1,426,385.
Patented Aug. 22, 1922.
3 SHEETS—SHEET 3.
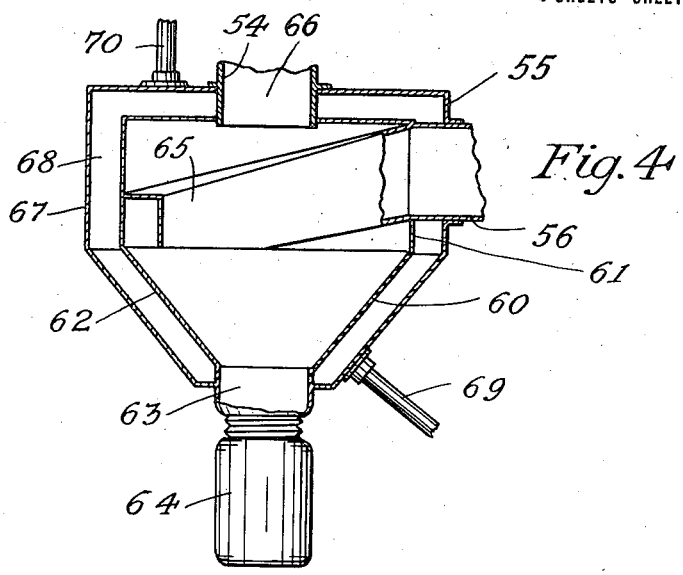
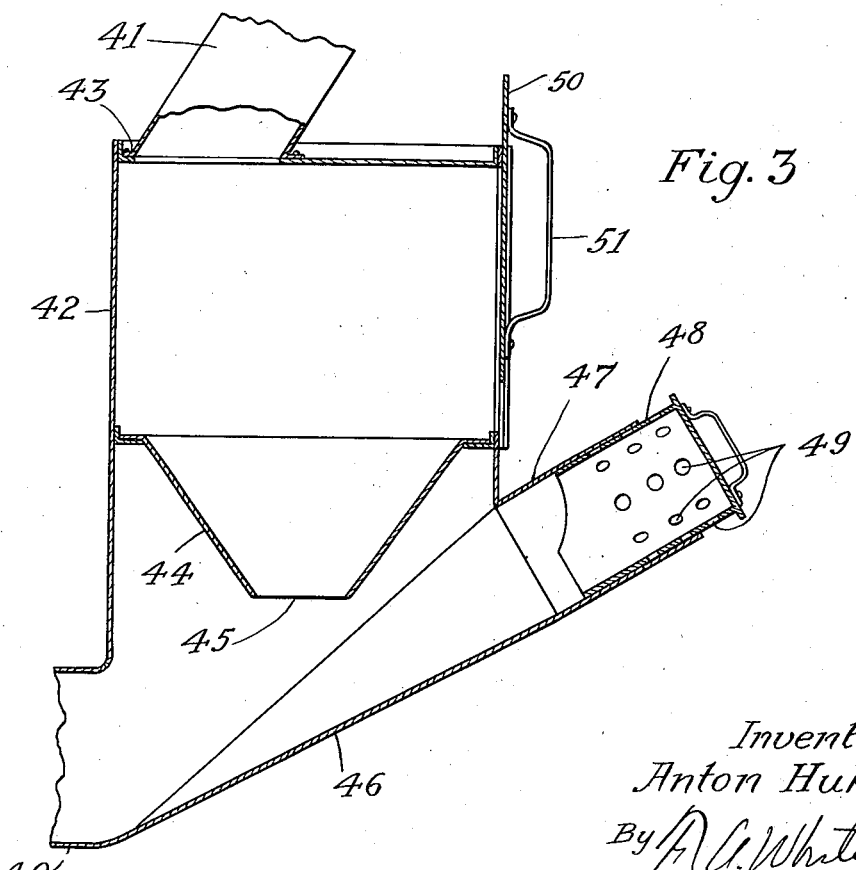
Inventor:
Anton Huhn.
By his Attorney.

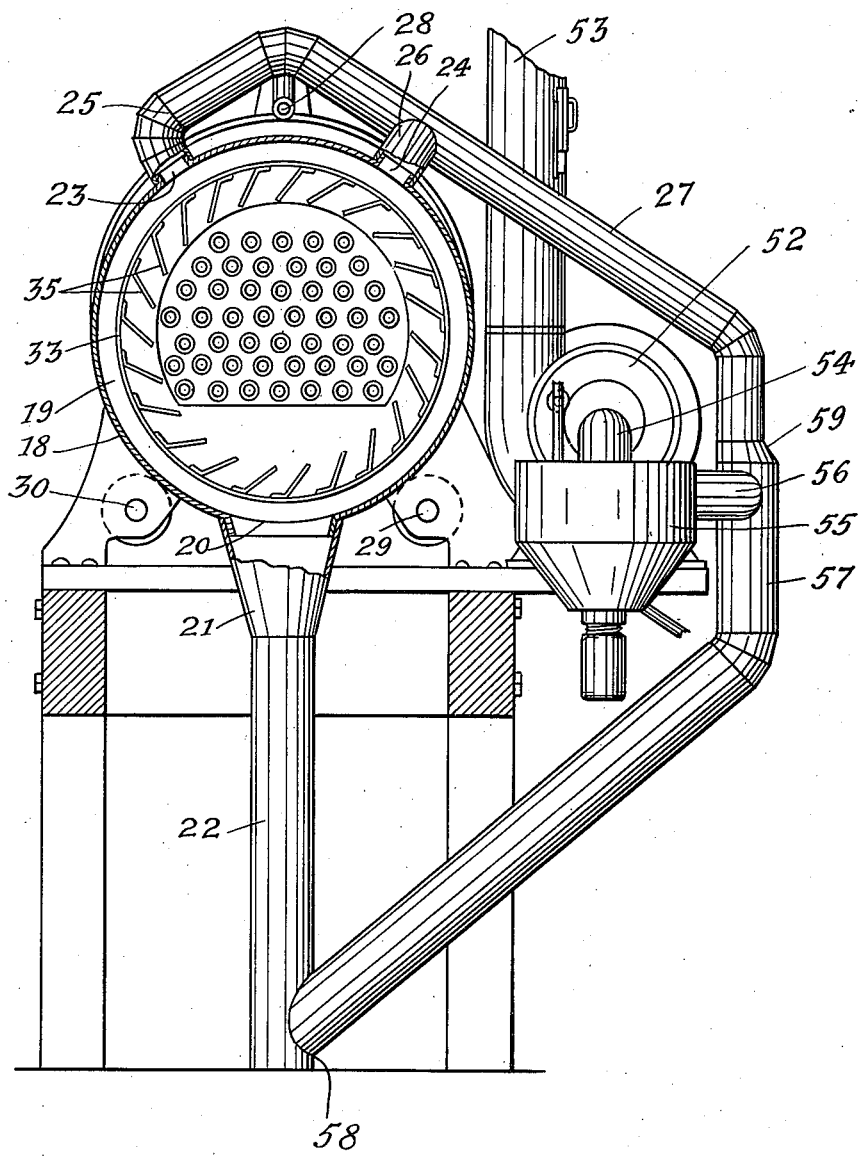

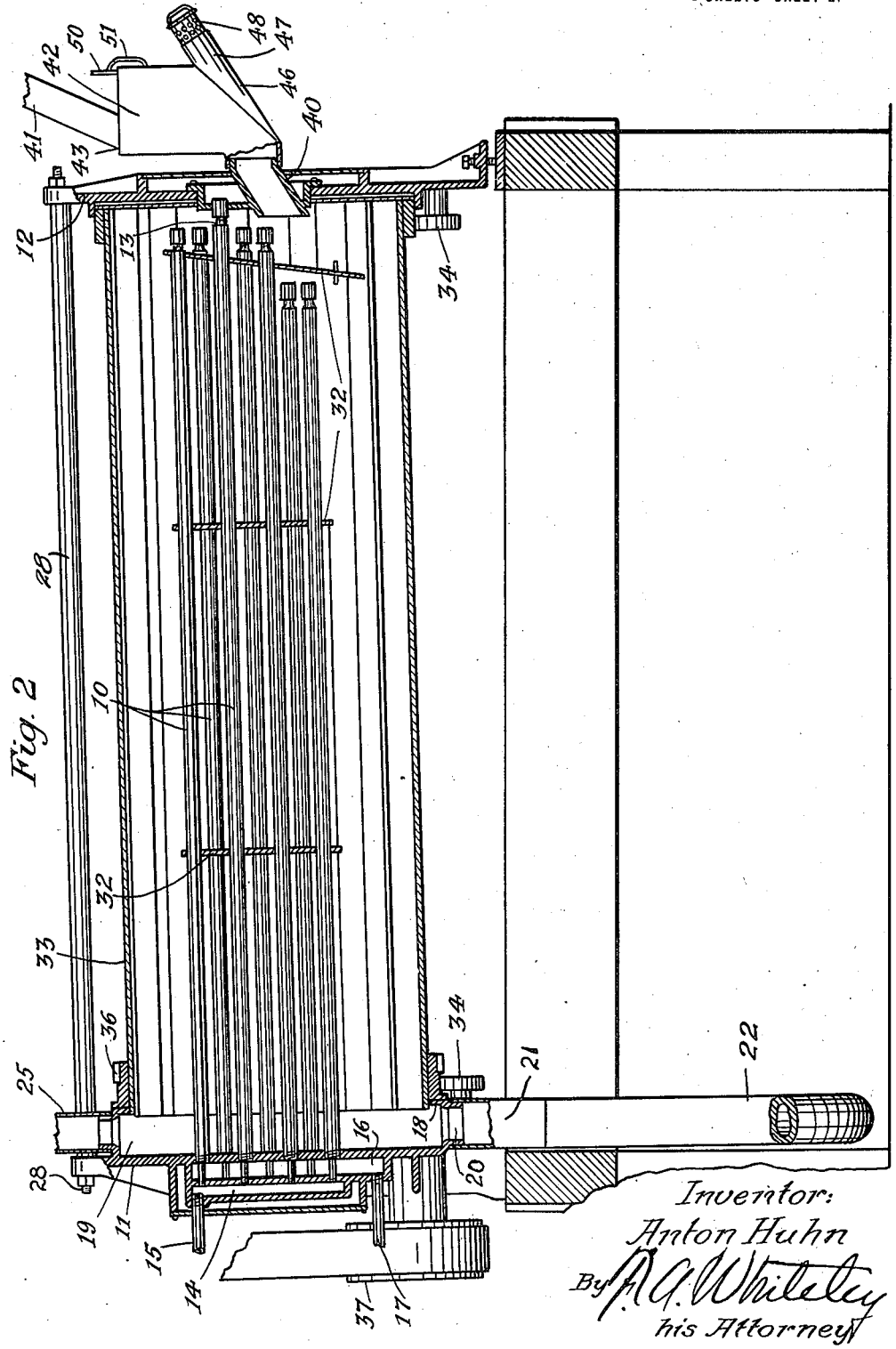

UNITED STATES PATENT OFFICE.

ANTON HUHN, OF MINNEAPOLIS, MINNESOTA.

APPARATUS FOR DRYING AND STERILIZING CEREALS.

1,426,385.  Specification of Letters Patent.  Patented Aug. 22, 1922.

Application filed August 13, 1917, Serial No. 185,828. Renewed January 14, 1922. Serial No. 529,371.

*To all whom it may concern:*

Be it known that I, ANTON HUHN, a citizen of the United States, residing at Minneapolis, in the county of Hennepin and State of Minnesota, have invented certain new and useful Improvements in Apparatus for Drying and Sterilizing Cereals, of which the following is a specification.

My invention relates to process and apparatus for drying and sterilizing cereals either in the form of the original grain such as wheat, corn, oats, rye, etc., or in a milled form such as corn meal, wheat granules, etc.

It is the object of my invention to treat the product by gradually heating the same from its natural state up to any desired temperature maintaining the particles of the product in a state of motion during the heating thereof, separating the particles of the product while so moved, subjecting the particles of the product to a current of air during the entire period of moving and heating the same and separating from said currents of air a part of the moisture and all of the dust before discharging the air into conduits from which they are discharged from the building.

The step of the removal of dust and part of the moisture from the air immediately after it has passed from the contact with the moving product being treated is an important step in my process. As otherwise, the dust and moisture, the latter under condensation as it passes through the conduits, will accumulate in a gummy substance on the side of the conduit very rapidly so that it soon becomes foul and entirely clogged. Furthermore, the dust product, especially from milled grains such as corn meal and wheat granules, is a valuable by-product the saving of which much more than meets the cost of the drying and sterilizing process.

My process and the apparatus here shown is applicable to grains such as wheat, corn, oats, etc., in preparing the same either for storage or milling. It frequently happens that a wet crop has to be harvested either through rainy weather during the period of harvest or because of bad weather during maturity of crop or for other reasons.

The process is also adapted to be used upon milled products wherein the water contained and the necessity of sterilization tend to cause the products to decay. The sterilization which has heretofore been practiced is not alone sufficient to prevent the decay of such products, but sterilization in combination with the removal of a large part of moisture contained in milled cereals will fit the same perfectly to keep for transport or storage.

The full objects and advantages of my invention will appear in connection with the detailed description thereof and are particularly pointed out in the claims.

In the drawings, illustrating the application of my invention in one form of apparatus,—

Fig. 1 is a transverse elevation view, some parts being in section, of an apparatus adapted to carry out my process. Fig. 2 is a longitudinal sectional view of part of the apparatus shown in Fig. 1. Fig. 3 is an enlarged part sectional view of the feed hopper in combination with the air inlet thereto. Fig. 4 is a part sectional view of a moisture and dust collecting apparatus employed in connection with my process.

As illustrated, a battery of parallel pipes 10 are all supported at one end and passed through a head 11 and are supported at the other end in a head 12 by some of the pipes, as indicated at 13, part of the pipes passing through head 11 into a steam supply box 14 to which steam under pressure is supplied from a pipe 15. The other of said pipes go to a discharge steam box 16 from which the steam is withdrawn through a pipe 17. Formed in conjunction with the head 11 is an annular rim 18 within which is a chamber 19 opening at the bottom through an aperture 20 into a small hopper 21 which discharges into a conveyer pipe 22. From the top of the chamber 19 extends two passageways 23 and 24 which are in communication through pipe members 25 and 26 with a pipe 27 having a function later to be pointed out. The heads 11 and 12 are rigidly secured in parallel relation by means of a set of tie rods such as shown at 28. The various steam pipes 10 are held in fixed relative position by a multiplicity of plates 32. Enveloping the battery pipes 10 is a cylinder 33 which is rotatably supported upon a multiplicity of rollers 34 journaled upon studs 29 and 30 carried on heads 11 and 12. The cylinder 33 is provided with a multiplicity of flights or slats 35 preferably depressed at an angle, as indicated at Fig. 1. The cylinder 33 is rotated by means of an annular gear 36 thereon which is driven by a spur gear, not shown, from a pulley 37.

The above parts are, or may be, in substance similar to the wheat heater apparatus illustrated and described in patent to Carter No. 1,181,434. Wheat or other products to be treated are fed into the apparatus through a passageway 40 which extends through the stationery portion connected with head 12 and the material so fed is repeatedly carried up by flights 35 and dropped over the hot pipes 10 gradually becoming warmer and warmer until it reaches the chamber 19 from whence it passes to the hopper 21 and discharge pipe 22.

In feeding the product to the inlet pipe 40 I pass it through a pipe 41 into a hopper casing 42 preferably at the top and toward the drum side of said casing as indicated at 43 in Figs. 2 and 3. Within the casing 42 is a hopper 44 having an aperture 45 which discharges over a sloping bottom wall 46. The sloping floor 46 extends upward to a cylindrical projection 47 having therein a slidable cap 48 provided with a multiplicity of apertures 49 which admit more or less air into the stream of grain as it passes through opening 45 and inlet pipe 40 into the cylinder, the amount of air being determined by the extent to which the cap 48 is moved in or out of the projection 47. The slide door 50 having a handle 51 gives access to the interior of casing 42 for examination of the product as it goes through the same.

A fan 52, of such force as may be requisite, discharges through the pipe or conduit 53 which may lead out of the building by any desired route and draws air through a pipe 54 and through a collecting device 55, later to be described, into which the air goes through a pipe 56 from an enlarged pipe 57 which connects at its lower end, as indicated at 58, with the discharge spout 22 and has its upper end, as indicated at 59, connected with the pipe 27. Air discharged through pipe 53 will therefore be drawn by the fan 52 from the air inlet openings 49 in hopper extension 47 through the entire length of drum 33 and through and across the falling grain thereon and by way of pipes 27 and 57 will finally pass to the collecting device 55 and thence through pipe 54 to the fan. It will be noted that air going to pipes 27 and 57 passes in substantially equal amounts from the top and bottom of the chamber 19, thus insuring that air will move in a substantially even cross section through the interior of cylinder 33 and the falling product thereon until it reaches the discharge openings 20, 23 and 24 from the cylinder at the bottom and top respectively of the annular chamber 19. Furthermore, the air which passes to the pipe 57 will, for a portion of the distance, be drawn through the falling product within pipe 22, thereby insuring final removal of dust, flour or other fine material which is undesirable in the finally treated product.

The air cleaner employed, shown in section in Fig. 4 comprises an inner casing 60, preferably having a cylindrical portion 61 and a conical portion 62 which opens at the bottom of conical portion through an aperture 63 into a removable collecting jar 64. Air entering the casing through pipe 56 is caused to whirl by an inner casing 65 thereby throwing the dust and dirt to the outside of the casing where it accumulates together with water condensing within casing 62 and passes down by gravity into container 64. Air thus freed of a part of its moisture and all of the dust passes outwardly through a central aperture 66 to the pipe 54 by which it is conveyed to the fan 52. An outer casing 67 provides a water circulation chamber 68 to which water is supplied and withdrawn by pipes 69 and 70. This provides that the inner surface of casing 62 shall be cooled below the condensation point of the moisture in the air going into said casing which results in condensation of a large part of the moisture in said air. This runs down a sloping wall together with the dust which is collected with it and passes into the jar 64 from whence it may ultimately be removed and the dust content extracted, which has a value for other purposes.

The advantages of my invention will be apparent. With this simple device requiring practically no additional power over that employed in connection with the heater I am enabled to progressively dry any cereal products such as natural grain, or a milled cereal such as corn meal so as to remove the moisture content during a heating process which shall be effective for sterilization and at the same time not to cook or burn the product. The operation is progressive and continuous and lends itself to perfectly uniform work on a large output. The operator at all times has perfect control of the process and is enabled to regulate the feed of the material, the temperature of the pipes and the volume of air passed through the product to produce the most even results. It is an essential feature of the process and apparatus for carrying it on that the dust together with some part of the moisture content of the air after it has passed through the product shall be withdrawn from the air and collected both because otherwise the discharge passages would inevitably become fouled and clogged and because the product so collected has a very considerable commercial value.

I claim:

1. Apparatus for drying and sterilizing cereals comprising a casing, means for feeding the cereals into the casing, means for progressively moving the particles of the cereals in a state of separation about and through said casing to the discharge end thereof, means for heating the cereal as it is moved, means for subjecting the cereal so moved to regulated currents of air during the entire period of moving and heating, means for acting upon the air of said currents immediately after it leaves the casing to cause the dust and solid ingredients carried in the air to be separated therefrom, and means for lowering the temperature of said dust separating means to cause a precipitation of a portion of the moisture content of the air.

2. Apparatus for drying and sterilizing cereals comprising a casing, means for admitting cereal and air at one end of the casing, means for discharging the cereal and the air at the other end of the casing, means for causing the air to move through said casing, a multiplicity of heated pipes within the casing, and means for rotating the casing to cause the cereal to be repeatedly lifted and dropped upon and between said pipes while the air current is passing through the casing.

3. Apparatus for drying and sterilizing cereals comprising a rotating drum closed at each end, a battery of heated pipes within the drum, means for feeding cereal and air into the drum at one end, means for permitting discharge of the cereal at the other end, and a fan having connection with said discharge means for drawing air into and through the drum while the cereal is being moved thereby over and between said pipes.

4. Apparatus for drying and sterilizing cereals comprising a rotating drum closed at each end, a battery of heated pipes within the drum, means for feeding cereal and air into the drum at one end, means for permitting discharge of the cereal at the other end, a fan having connection with said discharge means for drawing air into and through the drum while the cereal is being moved thereby over and between said pipes, and a dust collector in the air passage between the fan and the drum for removing dust, flour, etc., from the air before it reaches the fan and the discharge conduit therefrom.

5. Apparatus for drying and sterilizing cereals comprising a rotating drum closed at each end, a battery of heated pipes within the drum, means for feeding cereal into the drum at one end, means for admitting regulated amounts of air into the drum in connection with the cereal feed, a pipe for receiving and discharging the cereal at the other end, and a fan having connection with said pipe for drawing air into and through the drum while the cereal is being moved thereby repeatedly to pass upon and between said pipes.

6. Apparatus for drying and sterilizing cereals comprising a rotating drum closed at each end, a battery of heated pipes within the drum, means for feeding cereal into the drum at one end, means for admitting regulated amounts of air into the drum in connection with the cereal feed, a pipe for receiving and discharging the cereal at the other end, an air pipe having connection with said discharge pipe and with the upper portion of the front end of the drum, and a fan having connection with said air pipe for drawing air into and through the drum in a substantially uniform current of the cross-section of the drum while the cereal is being moved thereby to pass repeatedly over and between said pipes.

7. Apparatus for drying and sterilizing cereals comprising a rotating drum closed at each end, a battery of heated pipes within the drum, means for feeding cereal into the drum at one end, means for admitting regulated amounts of air into the drum in connection with the cereal fed, a pipe for receiving and discharging the cereal at the other end, an air pipe having connection with said discharge pipe and with the upper portion of the front end of the drum, a fan having connection with said air pipe for drawing air into and through the drum in a substantially uniform current of the cross-section of the drum while the cereal is being moved thereby to pass repeatedly over and between said pipes, and a dust collector between said air pipe and the fan.

8. Apparatus for drying and sterilizing cereals comprising a casing, means for feeding the cereals into the casing at one end, means for progressively moving the particles of the cereals in a state of separation above and through said casing to the discharge end thereof, means for heating the cereal as it is moved, means for causing a regulated current of air to pass through the cereal during the entire period of moving and heating thereof, and a condenser associated with the air-current inducing means for withdrawing moisture from the air immediately after it leaves the cereal.

9. Apparatus for drying and sterilizing cereals comprising a rotating drum closed at each end, a battery of heated pipes within the drum, means for feeding cereal into the drum at one end means for discharging it from the drum at the other end, means including a fan for drawing a continuous and regulated current of air through the drum, and a dust collector and condenser located between the fan and the drum for removing dust, flour, etc., and a part of the moisture from the air before it reaches the fan and the discharge conduit.

In testimony whereof I affix my signature.

ANTON HUHN.